United States Patent
Tshouva et al.

(10) Patent No.: US 11,231,948 B2
(45) Date of Patent: Jan. 25, 2022

(54) APPLYING SECURITY MITIGATION MEASURES FOR STACK CORRUPTION EXPLOITATION IN INTERMEDIATE CODE FILES

(71) Applicant: Sternum Ltd., Tel Aviv (IL)

(72) Inventors: Natali Tshouva, Rishon LeZion (IL); Lian Granot, Rishon LeZion (IL); Arik Farber, Tel Aviv (IL); Tai Granot, Tel Aviv (IL)

(73) Assignee: Sternum Ltd., Tel-Aviv (IL)

( * ) Notice: Subject to any disclaimer, the term of this patent is extended or adjusted under 35 U.S.C. 154(b) by 107 days.

(21) Appl. No.: 16/590,404

(22) Filed: Oct. 2, 2019

(65) Prior Publication Data

US 2020/0125378 A1  Apr. 23, 2020

Related U.S. Application Data

(60) Provisional application No. 62/747,150, filed on Oct. 18, 2018.

(51) Int. Cl.
*G06F 9/455* (2018.01)
*G06F 9/30* (2018.01)
(Continued)

(52) U.S. Cl.
CPC ...... *G06F 9/45508* (2013.01); *G06F 9/30058* (2013.01); *G06F 9/30098* (2013.01); *G06F 9/3806* (2013.01); *G06F 21/51* (2013.01)

(58) Field of Classification Search
CPC ............. G06F 9/30058; G06F 9/30098; G06F 9/3806; G06F 9/45508; G06F 21/51
(Continued)

(56) References Cited

U.S. PATENT DOCUMENTS 6,802,056 B1 * 10/2004 Chaiken .................. G06F 8/52
  717/136
7,668,314 B2 * 2/2010 Kuwabara ........ H04N 21/23897
  380/261

(Continued)

FOREIGN PATENT DOCUMENTS

WO   WO 2020/079676   4/2020

OTHER PUBLICATIONS

International Search Report and the Written Opinion dated Jan. 21, 2020 From the International Searching Authority Re. Application No. PCT/IL2019/051075. (11 Pages).

(Continued)

*Primary Examiner* — Chat C Do
*Assistant Examiner* — Bradford F Wheaton (57) ABSTRACT

Presented herein are methods and systems for generating intermediate code files adjusted to prevent return oriented programming exploitation, comprising receiving compiled intermediate code file(s) comprise a plurality of routines and adjusting them prior to generation of a respective executable file for execution by one or more processor. The adjusting comprising analyzing a symbol table of the intermediate code file(s) to identify a beginning address of each of the routines, analyzing each of the routines to identify indirect branch instructions in the routines, and replacing each detected indirect branch instruction with invocation of a verification code segment configured to verify that the respective indirect branch instruction points to the beginning address of one of the routines. In runtime, the verification code segment causes the processor(s) to initiate one or more predefined actions in case the indirect branch instruction isn't pointing to the beginning address of one of the plurality of routines.

11 Claims, 3 Drawing Sheets

(51) Int. Cl.
*G06F 21/51* (2013.01)
*G06F 9/38* (2018.01)

(58) Field of Classification Search
USPC .......................................................... 717/146
See application file for complete search history.

(56) References Cited

U.S. PATENT DOCUMENTS

| | | |
|---|---|---|
| 7,752,459 B2 | 7/2010 | Cowan et al. |
| 8,510,596 B1 | 8/2013 | Gupta et al. |
| 8,966,312 B1 | 2/2015 | Gupta et al. |
| 9,727,729 B2 | 8/2017 | Gupta |
| 9,754,112 B1* | 9/2017 | Moritz ................... G06F 21/54 |
| 10,079,841 B2 | 9/2018 | Gupta et al. |
| 2001/0021903 A1* | 9/2001 | Ryu ....................... G06F 30/33 |
| | | 703/14 |
| 2007/0101317 A1 | 5/2007 | Shoji et al. |
| 2008/0028379 A1* | 1/2008 | Stichnoth ............. G06F 9/4484 |
| | | 717/151 |
| 2009/0113403 A1* | 4/2009 | Davis ..................... G06F 8/443 |
| | | 717/146 |
| 2009/0282393 A1 | 11/2009 | Costa et al. |
| 2014/0237144 A1* | 8/2014 | Chew ..................... G06F 9/544 |
| | | 710/50 |
| 2015/0007142 A1* | 1/2015 | Biffle ..................... G06F 21/54 |
| | | 717/126 |
| 2015/0302195 A1 | 10/2015 | Acar et al. |
| 2016/0092676 A1 | 3/2016 | Crowe |

OTHER PUBLICATIONS

Prasad et al. "A Binary Rewriting Defense Against Stack Based Buffer Overflow Attacks", Proceedings of the USENIX Annual Technical Conference, General Track, p. 211-224, Jun. 9, 2003.
International Preliminary Report on Patentability dated Apr. 29, 2021 From the International Bureau of WIPO Re. Application No. PCT/IL2019/051075. (6 Pages).

* cited by examiner

APPLYING SECURITY MITIGATION MEASURES FOR STACK CORRUPTION EXPLOITATION IN INTERMEDIATE CODE FILES

RELATED APPLICATION(S)

This application claims the benefit of priority under 35 USC § 119(e) of U.S. Provisional Patent Application No. 62/747,150 filed on Oct. 18, 2018, the contents of which are incorporated by reference as if fully set forth herein in their entirety.

FIELD AND BACKGROUND OF THE INVENTION

The present invention, in some embodiments thereof, relates to applying protection against stack corruption exploitation, and, more specifically, but not exclusively, to adjusting intermediate code files to apply protection against stack corruption exploitation.

In the constantly advancing and evolving computerized modern environment, cyber threats have become a major concern. Malicious parties may launch cyber-attacks against multiple platforms, applications and/or services in attempt to gain control over them for a plurality of goals and/or objectives ranging from harmless hacking through exploitation for financial gain all the way to malicious interference in critical systems.

These concerns may be dramatically intensified with the rapid deployment of a huge number of devices, typically small low end embedded devices used to support automation in a plurality of fields, areas and markets, for example, autonomous vehicles, smart cities, agriculture, medical care and medical procedures and/or the like. Such low end embedded devices may typically have limited resources which may be insufficient for applying sophisticated mitigation measures to counter such cyber threats.

However, these limited resources embedded devices may be involved in critical applications, services and/or the like and may optionally serve as access points to higher level platforms and systems. Embedded devices may therefore present a major security breach which may be exploited by malicious parties.

SUMMARY OF THE INVENTION

According to a first aspect of the present invention there is provided a computer implemented method of generating compiled intermediate code files adjusted to apply return address protection, comprising:
  Receiving one or more intermediate code files generated by a compiler, the intermediate code file(s) comprising a plurality of routines.
  Adjusting one or more of the intermediate code file(s) prior to generation of a respective executable file to be executed by one or more processors. The adjusting comprising:
    Analyzing a symbol table of one or more of the intermediate code file(s) to identify each of the plurality of routines.
    Adjusting one or more of the plurality of routines to replace a return address push to stack instruction detected in the respective routine(s) with a respective prologue code segment and to replace each return address pop from stack instruction detected in the respective routine(s) with a respective epilogue code segment. The respective prologue code segment is configured to alter the stack after the return address is pushed to the stack and the respective epilogue code segment is configured to validate the stack alteration made by the respective prologue code segment before branching to the return address retrieved from the stack.
  Outputting the adjusted intermediate code file(s)
Wherein, in runtime, in case the stack alteration cannot be validated, the respective epilogue code segment causes one or more of the processor(s) to initiate one or more predefined action(s).

According to a second aspect of the present invention there is provided a system for generating compiled intermediate code files adjusted to apply return address protection, comprising a program store storing a code and one or more processors coupled to the program store for executing the stored code, the code comprising:
  Code instructions to receive one or more intermediate code files generated by a compiler, the intermediate code file(s) comprising a plurality of routines;
  Code instructions to adjust one or more of the intermediate code file(s) prior to generation of a respective executable file to be executed by one or more processors, the adjusting comprising:
    Analyzing a symbol table of one or more of the intermediate code file(s) to identify each of the plurality of routines.
    Adjusting one or more of the plurality of routines to replace an address push to stack instruction detected in the respective routine(s) with a respective prologue code segment and to replace each address pop from stack instruction detected in the respective routine(s) with a respective epilogue code segment. The respective prologue code segment is configured to alter the stack after the return address is pushed to the stack and the respective epilogue code segment is configured to validate the stack alteration made by the respective prologue code segment before branching to the return address retrieved from the stack.
  Code instructions to output the adjusted intermediate code file(s);
Wherein, in runtime, in case the stack alteration cannot be validated, the respective epilogue code segment causes one or more of the processor(s) to initiate one or more predefined actions.

According to a third aspect of the present invention there is provided a computer program executable file generated from intermediate code files adjusted to apply return address protection, comprising a non-transitory computer readable storage medium and a plurality of program instructions of one or more adjusted routines of an executable file generated for execution by one or more processor from one or more intermediate code files adjusted to support return address protection. In each of the adjusted routine(s) an address push to stack instruction is replaced with a respective prologue code segment and each address pop from stack instruction is replaced with a respective epilogue code segment. The respective prologue code segment is configured to alter the stack after the return address is pushed to the stack and the respective epilogue code segment is configured to validate the stack alteration made by the respective prologue code segment before branching to the return address retrieved from the stack. In case the stack alteration cannot be validated, the respective epilogue code segment causes one or more of the processor(s) to initiate one or more predefined actions. Wherein the plurality of program instructions are executed by one or more of the processor(s) from the non-transitory computer readable storage medium.

According to a fourth aspect of the present invention there is provided a computer implemented method of generating compiled intermediate code files adjusted to prevent return oriented programming exploitation, comprising:
Receiving one or more intermediate code files generated by a compiler, the intermediate code file(s) comprising a plurality of routines.
Adjusting one or more of the intermediate code file(s) prior to generation of a respective executable file to be executed by one or more processors. The adjusting comprising:
Analyzing a symbol table of one or more of the intermediate code file(s) to identify a beginning address of each of the plurality of routines.
Analyzing each of the plurality of routines to identify one or more indirect branch instructions in the respective routine(s).
Replacing each indirect branch instruction detected in one or more of the plurality of routines with an invocation of a respective verification code segment configured to verify, prior to executing the respective indirect branch operation, that the respective indirect branch instruction points to the beginning of one of the plurality of routines.
Outputting the adjusted intermediate code file(s).
wherein, in runtime, in case the indirect branch instruction is not pointing to the beginning of one of the plurality of routines, the respective verification code segment causes one or more of the processor(s) to initiate one or more predefined actions.

According to a fifth aspect of the present invention there is provided a system for generating compiled intermediate code files adjusted to prevent return oriented programming exploitation, comprising a program store storing a code and one or more processors coupled to the program store for executing the stored code, the code comprising:
Code instructions to receive one or more intermediate code files generated by a compiler, the intermediate code file(s) comprising a plurality of routines.
Code instructions to adjust one or more of the intermediate code file(s) prior to generation of a respective executable file to be executed by one or more processors, the adjusting comprising:
Analyzing a symbol table of one or more of the intermediate code file(s) to identify a beginning address of each of the plurality of routines.
Analyzing each of the plurality of routines to identify one or more indirect branch instructions in the respective routine(s).
Replacing each indirect branch instruction detected in each of the plurality of routines with an invocation of a respective verification code segment configured to verify, prior to executing the respective indirect branch operation, that the respective indirect branch instruction points to the beginning of one of the plurality of routines.
Code instructions to output the adjusted intermediate code file(s);
Wherein, in runtime, in case the indirect branch instruction is not pointing to the beginning of one of the plurality of routines, the respective verification code segment causes one or more of the processor(s) to initiate one or more predefined actions.

According to a sixth aspect of the present invention there is provided a computer program executable file generated from intermediate code file adjusted to prevent return oriented programming exploitation, comprising a non-transitory computer readable storage medium and a plurality of program instructions of one or more adjusted routines of a plurality of routines of an executable file generated for execution by one or more processors from one or more intermediate code files adjusted to support return address protection. In each of the adjusted routine(s) each indirect branch instruction is replaced with an invocation of a respective verification code segment configured to verify that the respective indirect branch instruction points to the beginning of one of the plurality of routines. In case the indirect branch instruction is not pointing to a beginning of one of the plurality of routines, the respective verification code segment causes one or more of the processor(s) to initiate one or more predefined actions. Wherein the plurality of program instructions are executed by one or more of the processor(s) from the non-transitory computer readable storage medium.

In a further implementation form of the first, second, third, fourth, fifth and/or sixth aspects, each intermediate code file is a member of a group consisting of: an object file, an archive file and a binary file.

In a further implementation form of the first, second, third, fourth, fifth and/or sixth aspects, each of the plurality of routines is a member of a group consisting of: a routine, a sub-routine and a function.

In a further implementation form of the first, second, third, fourth, fifth and/or sixth aspects, the predefined action are members of a group consisting of: crashing execution of one or more of the processor(s), halting execution of one or more of the processor(s), causing one or more of the processor(s) to branch to a predefined address, preventing one or more of the processor(s) from executing one or more potentially malicious code instructions and generating an indication of an invalid stack alteration.

In a further implementation form of the first, second, third, fourth, fifth and/or sixth aspects, one or more of the intermediate code file(s) are adjusted to amend one or more of: an instruction and a data element affected by the addition of the added code segments.

In a further implementation form of the first, second, third, fourth, fifth and/or sixth aspects, one or more of the intermediate code file(s) are amended to update their symbol table to reflect the added code segments and an increase to size of the adjusted routines.

In a further implementation form of the first, second and/or third aspects, in case the address push to stack instruction is associated with pushing one or more data items to the stack, the respective prologue code segment is configured to push the data item(s) to the stack and the respective epilogue code segment is configured to pop the data item(s) from the stack.

In a further implementation form of the first, second and/or third aspects, the stack alteration is based on altering the return address in a reversible manner by:
Configuring the respective prologue code segment to read the return address pushed to the stack, alter the return address in a reversible manner and push the altered return address back into the stack.
Configuring the respective epilogue code segment to read the altered return address from the stack address, recover the return address from the altered return address by reversing the operation made by the respective prologue code segment and push the recovered return address back into the stack.

In a further implementation form of the first, second and/or third aspects, the return address alteration is based on a XOR operation of the return address with a randomly selected value such that the respective prologue code segment is configured to XOR the return address with the randomly selected value and the respective epilogue code segment is configured to XOR the altered return address with the same randomly selected value.

In a further implementation form of the first, second and/or third aspects, the stack alteration is based on pushing a marker into the stack in a location adjacent to the location of the pushed return address by:

Configuring the respective prologue code segment to insert a constant value marker in the adjacent location in the stack.

Configuring the respective epilogue code segment to verify the constant value marker and remove the constant value marker from the stack.

In a further implementation form of the first, second and/or third aspects, the constant value marker is randomly selected during every startup event of one or more of the processor(s).

In a further implementation form of the first, second and/or third aspects, the stack alteration is based on pushing a marker into the stack in a location adjacent to the location of the pushed return address by:

In a further implementation form of the first, second and/or third aspects, the respective prologue code segment, the respective epilogue code segments and/or the verification code segment are added to the routine(s) by replacing the address push to stack instruction and each of the address pop from stack instructions with a trampoline branch function configured to invoke the respective added code segment during the push and pop address operations.

In a further implementation form of the fourth, fifth and/or sixth aspects, verification of the indirect branch instruction pointing to the beginning of one of the plurality of routines is based on verification of a unique code preceding each of the plurality of routines in one or more of the intermediate code file(s), the unique code verification is applied by:

Adding a unique code to one or more of the intermediate code file(s) in an address preceding the address of the beginning of each of the plurality of routines.

Configuring the respective verification code segment to verify that the address pointed by the indirect branch function is preceded by the unique code.

In a further implementation form of the fourth, fifth and/or sixth aspects, verification of the indirect branch instruction pointing to the beginning of one of the plurality of routines is based on a dataset mapping the beginning of each of the plurality of routines, the dataset mapping verification is applied by:

Constructing the dataset to map the beginning address of each of the plurality of routines.

Configuring the respective verification code segment to verify that the address pointed by the indirect branch function matches the beginning address of one of the plurality of routines mapped in the dataset.

In a further implementation form of the fourth, fifth and/or sixth aspects, the routine(s) is adjusted by replacing the indirect branch instruction with a direct branch instruction pointing to the respective verification code segment.

In an optional implementation form of the fourth, fifth and/or sixth aspects, the routine(s) is adjusted to include a push to stack instruction before the direct branch instruction for pushing to stack an address pointed by the indirect branch instruction. The pushed address is used by the verification code segment for the verification.

In a further implementation form of the fourth, fifth and/or sixth aspects, the verification code segment is added to the routine(s) by replacing the indirect branch instruction with a trampoline branch function configured to invoke the respective added verification code segment prior to executing the indirect branch instruction.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to applying protection against stack corruption exploitation, and, more specifically, but not exclusively, to adjusting intermediate code files to apply protection against stack corruption exploitation.

According to some embodiments of the present invention, there are provided methods, systems and computer program products for adjusting one or more intermediate code files, for example, an object file, a binary file, a library file, an archive file and/or the like generated from one or more source code files by one or more compilers to include additional code configured to apply Return Address Protection (RAP) in the intermediate code file(s). The intermediate code file(s) comprising a plurality of routines, sub-routines, functions and/or the like collectively designated routine herein after are adjusted prior to being used for generation, for example, build, linkage and/or the like of one or more executable file(s). The executable file(s) may be executed by one or more processors of one or more devices, systems and/or platforms collectively designated device herein after.

Malware (malicious code), for example, a computer virus, a worm, a Trojan horse, a ransomware, a spyware, an adware, a scareware and/or the like may be used by a potentially malicious party(s) to gain control over the processor(s)' control (execution) flow. The malware may apply one or more security exploits, for example, buffer overflow, buffer overrun and/or the like to manipulate the stack (implemented in a volatile memory resource) of the processor(s) in attempt to gain control over the processor(s) using the return address upon return from one or more of the routines executed by the processor(s). By causing a buffer overflow, it may be possible for the malware to place malicious code in areas known to hold executable code or to selectively overwrite data pertaining to the program's state, therefore causing behavior that was not intended by the original programmer.

To manipulate the stack in runtime, the malware may take advantage of push to stack and/or pop from stack instructions present in the code for branch operations in which the push/pop to/from stack instructions are used for return address store and retrieve operations applied to facilitate return to an originating (calling) routine from which the currently executed routine was called. The push/pop to/from stack instructions are therefore susceptible to exploitation by the malware. In another example, the malware may take advantage of push/pop to/from stack instructions present in the code for pointers to data elements, in particular global data elements, for example, a variable, a structure, an array and/or the like. In such case the malware may attempt to replace and/or overrun one or more of the pointed data element(s) with malicious code in order to gain control over the control flow of the processor(s) and/or to cause the processor(s) to perform unintended operation(s).

In order to apply the RAP in the intermediate code file(s), one or more of the routines in the intermediate code file(s) may be adjusted to include RAP logic (code) adapted to identify manipulation of the stack in runtime and prevent the malware from taking control over the processor(s)' control flow by manipulating the stack. Each intermediate code file may be first analyzed to identify the plurality of routines. Each of the routines may be further analyzed to identify return address push to stack instructions and corresponding return address pop from stack instructions. The identified return address push to stack instructions and corresponding return address pop from stack instructions may be replaced with code segments configured to identify manipulation(s) made to the stack by the malware.

Each return address push to stack instruction may be replaced with a prologue code segment configured to alter the stack in a certain manner after the return address is pushed to the stack. Complementary, each return address pop from stack instruction may be replaced with an epilogue code segment configured to validate the stack alteration made by the corresponding prologue code segment before branching to the return address retrieved from the stack.

During runtime, in case the epilogue code segment is unable to verify the stack alteration made by the corresponding prologue code segment, the epilogue code segment may initiate one or more predefined actions directed to prevent the malware from taking control. The predefined actions may include for example, crashing execution of the processor(s), halting execution of the processor(s), causing the processor(s) to branch to a predefined address, preventing the processor(s) from executing at least one potentially malicious code instruction targeted by a corrupted stack, generating one or more indications and/or alerts of invalid stack alteration and/or the like. The predefined actions may be selected according to one or more parameters of the control (execution) flow, for example, the processor architecture, a severity and/or criticality of each routine, a user defined parameter and/or the like.

The added code segments typically comprise very simple logic implemented by a limited and significantly small number of instructions thus having a very small footprint requiring insignificant storage resources and/or computing resources.

According to some embodiments of the present invention, there are provided methods, systems and computer program products for adjusting one or more of the intermediate code files to include added code configured to prevent Return Oriented Programming (ROP).

In many computing devices, systems, platforms and/or environments malicious party(s) may be unable to execute code from the heap and/or from the stack of the processor(s) and may be unable to inject (add, insert, etc.) malware to the executable code environment. In such cases the malicious party(s) may take advantage of one or more code elements (also referred to as gadgets), for example, a function, a code segment, a code fraction and/or the like already available in the executable file. The malicious party(s) may operate such gadget(s) to divert the processor(s) executing the executable file from its normal execution path to an alternate execution path which may present one or more potential cyber threats.

In such computing devices, systems, platforms and/or environments the execution flow may always branch to address locations which are the beginning addresses of routines. However, in order to launch, execute and/or initiate the gadgets, the malicious party may apply ROP to exploit one or more routine branch operations by manipulating the call stack used by the branch operation to invoke the gadget(s) instead of a valid routine. In particular, the malicious party may exploit indirect branch operations where the branch address is retrieved from a volatile memory resource (e.g. stack, heap, register, etc.). Direct branch operations, in which the branch address is hardcoded, may not be exposed to ROP exploitation since the branch address is not retrieved from a volatile memory resource. The ROP exploitation prevention logic and measures described herein are therefore directed to indirect branches rather than to direct branches.

In order to apply the ROP exploitation prevention in the intermediate code file(s), one or more of the routines in the intermediate code file(s) may be adjusted to include ROP exploitation prevention logic configured to prevent branching to address locations which are not the beginning of valid routines thus preventing the malicious party(s) from using the gadget(s) typically located within the routines for gaining control over the processor(s)' execution flow.

Each intermediate code file may be analyzed to identify the plurality of routines. Each of the routines is further analyzed to identify indirect branch instructions. Each of the identified indirect branch instructions may be adjusted to invoke a verification code segment configured to verify that the branch address pointed by the respective indirect branch instruction is a beginning address of one of the plurality of routines.

During runtime, in case the verification code segment determines that the branch address pointed by one or more of the indirect branch instructions does not point to a beginning address of one of the plurality of routines, the verification code segment may initiate one or more predefined actions directed to prevent the malicious party(s) from gaining control over the processor(s)' execution flow by manipulating the indirect branch instruction to point to an alternate address which may be the address of the gadget(s).

Applying the RAP and ROP exploitation security mitigations by adjusting the intermediate code file(s) in post-compilation phase may present significant advantages and benefits compared to existing methods and systems for incorporating RAP and ROP exploitation measures into the code.

First, the RAP and ROP exploitation mitigation measures are applied in the intermediate code files compared to the existing methods which may be able to apply such mitigation measures in source code files. Therefore, in contrast to the existing methods, the RAP and ROP exploitation mitigation measures may be applied to intermediate code files for which the source code is not available, for example, $3^{rd}$ party intermediate code files, library files, and/or the like.

Moreover, some of the existing methods may require and/or rely on specific platform, hardware and/or software capabilities and functionality, for applying the RAP and/or ROP exploitation mitigation, for example, heap isolation, tasks invocation, kernel-user separation and/or the like. In contrast, applying the RAP and ROP exploitation mitigation measures through adjustment of the routine(s) in the intermediate code file(s) is independent of such requirements and/or prerequisite and is therefore oblivious and agnostic of the operating system, hardware features, architecture specifics and/or the like. As such, the RAP and ROP exploitation mitigation measures may be applied to practically any platform, architecture, execution environment, operating system and/or the like.

Furthermore, some of the existing methods may require operating system resources for applying the RAP and ROP exploitation mitigation measures, for example, dynamically loadable code modules, system calls, interrupt handlers and/or the like. Such dynamically loadable code modules may not be available for a plurality of computing devices, systems and/or platforms in particular low end and/or limited resources devices, for example, embedded devices, IoT devices, medical devices and/or the like. In contrast, applying the RAP and ROP exploitation mitigation measures through adjustment of the routine(s) in the intermediate code file(s) may allow applying the mitigation measures to practically any type of intermediate code file used to generate executable files ranging from simple single binary file firmware to complex operating systems.

In addition, the RAP and ROP exploitation mitigation measures, i.e. the added code segments comprise very simple logic and a limited low number of instructions thus requiring very limited and typically insignificant processing and/or storage resources for their execution and/or storage. As such the applied RAP and ROP exploitation mitigation measures may be highly suitable for the low end and/or typically limited resources devices.

Also, applying the RAP and ROP exploitation mitigation measures in the intermediate code files may require no change, modification, alteration and/or adaptation to the development environment as may be required by the existing methods. Since development environments comprising one or more tools, for example, toolchain, compiler, linker, builder and/or the like may be significantly complicated adjusting them may require significant resources and/or time thus rendering the existing methods costly, inefficient and/or limited. In contrast, the RAP and ROP exploitation mitigation measures applied in the adjusted intermediate code file(s) may be easily integrated into existing development environment(s) and software package builds with no impact to the developer's environment. For example, the tool(s) and/or procedures required for generating and adding the added code segments may be invoked by adding one or more entries (lines) in one or more build and/or link configuration files, for example, a makefile and/or the like. Moreover, since the RAP and ROP exploitation mitigation measures are applied in the intermediate code files and hence not impacting the developer's toolchain, the developer does not need to be trained to use a modified toolchain as may be required in the existing methods.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
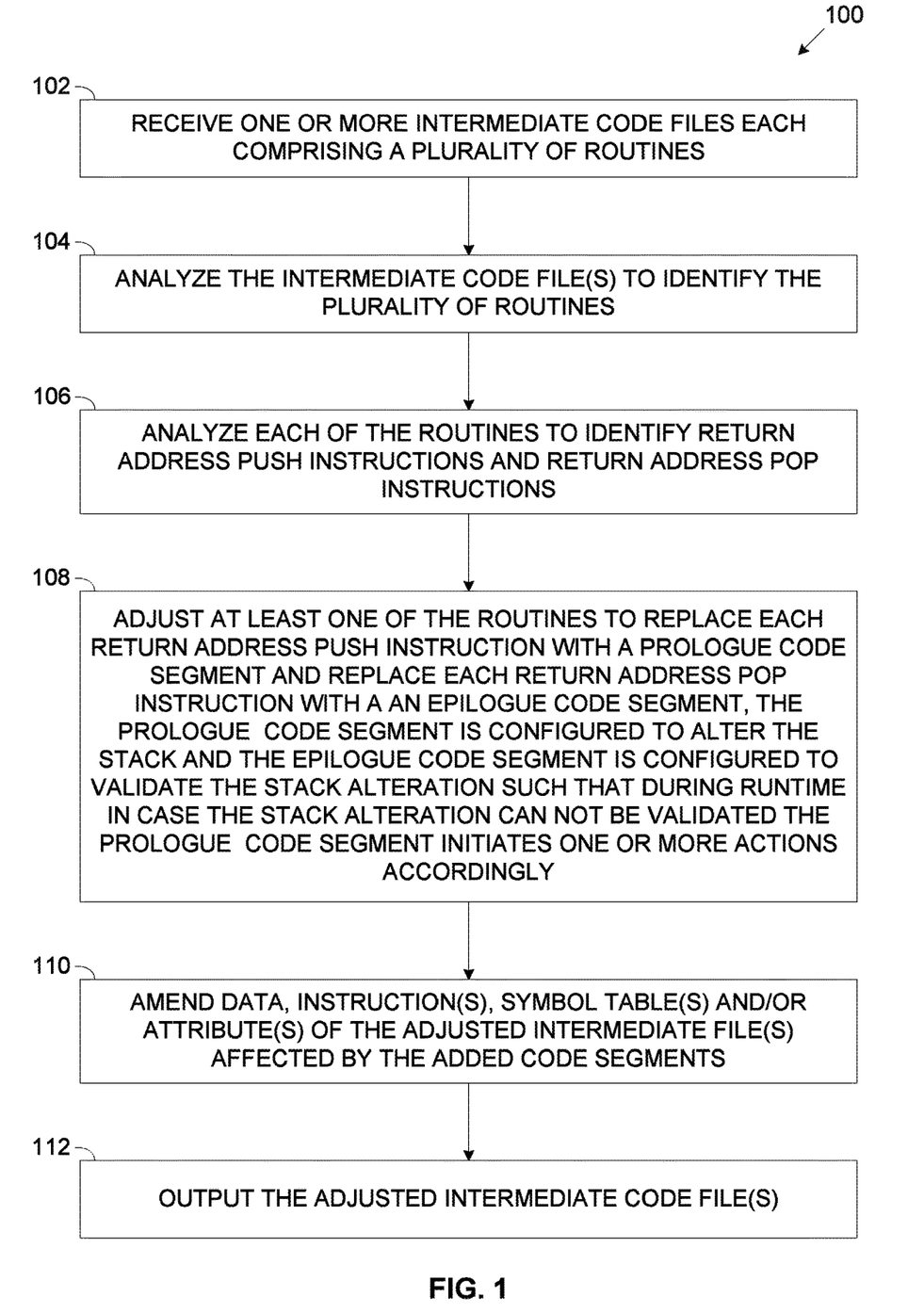
FIG. 1 is a flowchart of an exemplary process of adjusting intermediate code files to apply return address protection, according to some embodiments of the present invention.

Referring now to the drawings, FIG. 1 illustrates a flowchart of an exemplary process of adjusting intermediate code files to apply return address protection, according to some embodiments of the present invention. An exemplary process 100 may be executed for adjusting one or more intermediate code files, for example, an object file, a binary file, a library file, an archive file and/or the like generated from one or more source code files by one or more compilers to include code configured to apply RAP in the intermediate code file(s). The intermediate code file(s) comprising a plurality of routines, sub-routines, functions and/or the like collectively designated routine herein after are adjusted prior to being used for generation, for example, build, linkage and/or the like of executable file(s) created for execution by one or more processors of one or more devices.

As described herein before, in runtime a malware may apply one or more security exploits to manipulate the stack of the processor(s) in attempt to gain control over the processor(s) using the return address upon return from one or more of the routines executed by the processor(s) to invoke a malicious code. In order to apply the RAP, the intermediate code file(s) may be adjusted to include RAP logic adapted to identify manipulation of the stack in runtime and prevent the malware from taking control over the processor(s)' control (execution) flow.

Figure 2:
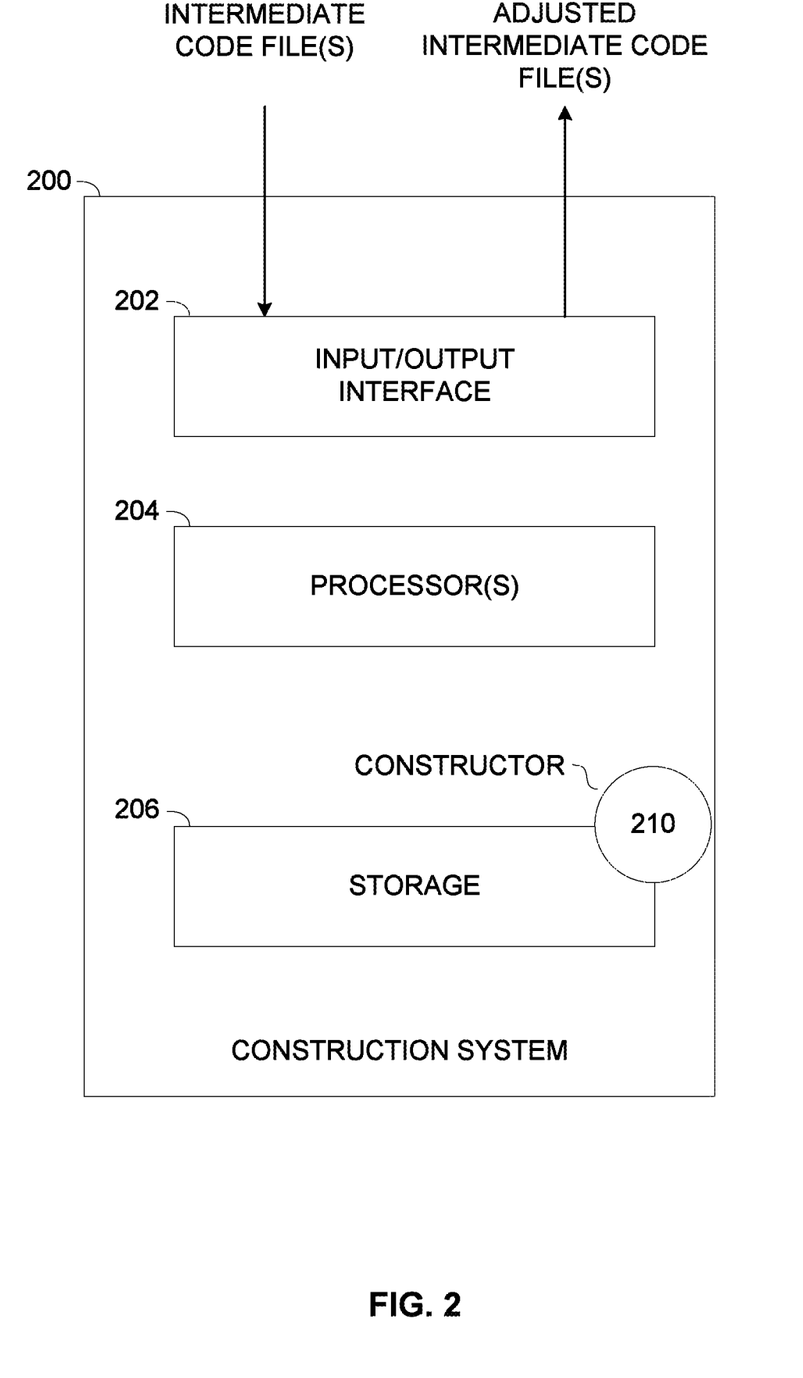
FIG. 2 is a schematic illustration of an exemplary system for adjusting intermediate code files to apply protection against memory corruption exploitation, according to some embodiments of the present invention.

Reference is also made to FIG. 2, which is a schematic illustration of an exemplary system for adjusting intermediate code files to apply protection against memory corruption exploitation, according to some embodiments of the present invention. An exemplary construction system 200, for example, a computer, a server, a computing node, a cluster of computing nodes and/or the like may include an Input/Output (I/O) interface 202, a processor(s) 204 for executing a process such as the process 100 and a storage 206 for storing code and/or data.

The I/O interface 202 may include one or more network interfaces for connecting to one or more wired and/or wireless networks, for example, a Local Area Network (LAN), a Wide Area Network (WAN), a Municipal Area Network (MAN), a cellular network, the internet and/or the like. The I/O interface 202 may further include one or more interfaces, for example, a Universal Serial Bus (USB), an attachable storage interface and/or the like for connecting to one or more local resources, for example, an external disk drive, another computing device and/or the like.

The processor(s) 204, homogenous or heterogeneous, may include one or more processing nodes arranged for parallel processing, as clusters and/or as one or more multi core processor(s). The storage 206 used for storing data and/or program code may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 206 may further comprise one or more local and/or remote network storage resources, for example, a storage server, a Network Attached Storage (NAS), a network drive, and/or the like accessible via one or more networks through the I/O interface 202.

Through the I/O interface 202, the construction system 200 may obtain, for example, receive, fetch and/or retrieve one or more intermediate code files generated by one or more compilers from one or more source code files. The construction system 200 may obtain the intermediate code file(s) from one or more remote network resources, for example, a server, a processing node, a storage server, a NAS, a cloud service, cloud storage and/or the like. Additionally and/or alternatively, via the I/O interface 202, the construction system 200 may obtain the intermediate code file(s) from a locally attached storage resource, for example, an attachable storage media, another computing node and/or the like. The construction system 200 may optionally locally store the obtained intermediate code file(s) in the storage 206.

The processor(s) 204 may execute one or more software modules, for example, a process, a script, an application, an agent, a utility, a tool and/or the like each comprising a plurality of program instructions stored in a non-transitory medium such as the storage 206 and executed by one or more processors such as the processor(s) 204. For example, the processor(s) 204 may execute an analysis and construction application (constructor) 210 for adjusting the intermediate code file(s) to apply the RAP. Optionally, the constructor 210 may be integrated and/or invoked in one or more development environments comprising one or more tools, for example, a toolchain, a compiler, a linker, a builder and/or the like. For example, the constructor 210 may be invoked by adding one or more entries (lines) in one or more build and/or link configuration files, for example, a makefile and/or the like.

Optionally, the construction system 200 and/or the constructor 210 are provided by one or more cloud computing services, for example, Infrastructure as a Service (IaaS), Platform as a Service (PaaS), Software as a Service (SaaS) and/or the like provided by one or more cloud infrastructures and/or services such as, for example, Amazon Web Service (AWS), Google Cloud, Microsoft Azure and/or the like.

As shown at 102, the process 100 starts with the constructor 210 obtaining one or more intermediate code files, for example, an object file, a binary file, a library file, an archive file and/or the like may be generated by one or more compilers from one or more source code files. The intermediate code file(s) may be obtained in one or more file formats, for example, Executable and Linkable Format (ELF) and/or the like. The intermediate code file(s) may typically be used for generating, building and/or linking one or more executable files which may be executed by one or more processors. The constructor 210 may obtain the intermediate code file(s) from one or more sources, for example, the remote network resource(s), the attachable storage device and/or the storage 206.

As shown at 104, the constructor 210 may apply one or more intermediate code files analysis tools to analyze each of the intermediate code file(s) to identify all the routines of the intermediate code file. For example, the constructor 210 may utilize "pyelftools", which is a python tool (library) for analyzing and parsing ELF files. Using the "pyelftools" tool, the constructor 210 may scan the symbol table of intermediate file(s) in ELF format to identify routines' symbols, and detect the routines' addresses in their respective code sections. The constructor 210 may be adapted to analyze the intermediate code file(s) according to the architecture and instruction set of the processor(s) targeted by the intermediate code file(s) are complied, for example, ARM, ARM-Thumb, x86, x86-64, power ISA and/or the like.

For example, the constructor 210 may identify the routines by iterating over a symbol table of the intermediate code file to identify and map the symbols generated by the compiler(s) for each of the routines in the intermediate code file. For example, in the ARM-Thumb architecture each ".o" object (intermediate) file is implemented in the ELF file format. The constructor 210 may identify the routines symbols' names by iterating over the entries in the "symbol table" section assigned with the extension ".symtab" in the ELF standard. The symbol table comprises information required for locating and relocating program's symbolic definitions and references. Each symbol entry associated with one of the routines in the symbol table is characterized by having a non-zero size field, a type 'FUNC' field and an Index field which references one of the "code" sections in the ".o" object (intermediate) file. One or more of the symbol table entries may further include a bind 'GLOBAL' field and/or a bind 'LOCAL' field.

The constructor 210 may further analyze each of the intermediate code file(s) to identify a beginning address of each of the routines in the intermediate code file. For example, in the ARM-Thumb architecture, the value of the "Function" (routine) symbol in the symbol table is "beginning of function (routine) +1" to specify that the function contains Thumb code. In such case, and optionally in similar cases for other processor architectures, the constructor 210 may extract the routine "value" from the symbol table of an ".o" object (intermediate) file and perform the opposite mathematical operation to extract the actual beginning address of the routine, i.e. "value −1".

A shown at 106, the constructor 210 analyzes one or more of the plurality of routines in each of the intermediate code file(s) to identify return address push to stack instruction and one or more corresponding return address pop from stack instructions. The constructor 210 may analyze the routines by first extracting their binary (machine) code and disassembling the machine code to provide assembly code of the routines. The constructor 210 analyzes nay further analyze the routines to identify one or more push to stack instructions and respective pop from stack instructions to pointers of data elements, for example, a variable, a structure, an array and/or the like.

The constructor 210 may extract the binary code of the routine(s) from the intermediate code file using the information in the symbol table entry corresponding to each routine. The constructor 210 may then apply one or more intermediate code file disassembly methods, techniques and/or tools to disassemble the routine's binary code into assembly instructions and analyze the assembly instructions. For example, the constructor 210 may utilize the "pyelftools" tool to extract the code of each routine as machine code. The constructor 210 may apply one or more tools, for example, "Capstone Disassembler" and/or the like, to disassemble the extracted machine code.

The syntax and/or opcodes of the return address push to stack instructions and return address pop from stack instructions may vary between processor architectures and/or instructions sets. The constructor 210 may therefore be adapted to analyze the routines to identify the return address push to stack and return address pop from stack instructions according to the syntax of the processor architecture and instructions set selected for generating the intermediate code file(s). For example, assuming the processor architecture is the ARM-Thumb architecture, the constructor 210 may search each disassembled routine to identify the push to stack instructions implemented by one or more ARM-Thumb opcodes such as, for example, PUSH {RegisterName1, . . . , RegisterNameN}, STMFD SP!, {RegisterName1, . . . , RegisterNameN}, STMIA SP!, {RegisterName1, . . . , RegisterNameN} and more. In some of the processor architectures, for example, the x86 architecture, the return address may be automatically pushed to the stack with no specific push to stack instruction present in the code. In such case, the constructor 210 may identify the instruction pushing the base pointer onto the stack.

Moreover, the constructor 210 may be adapted to iterate through a predefined number of instructions at the beginning of one or more of the routines to detect the return address push to stack instructions. In case the constructor 210 does not find a return address push to stack instruction in the beginning of a certain routine, the constructor 210 may determine that the certain routine is a "leaf" routine which does not call (branch) to other routines and therefore does not include push to stack and corresponding pop from tack operations. As such, the certain routine may not be susceptible to stack overrun exploitation and the constructor 210 and may mark the certain routine accordingly, i.e. no need to apply the RAP measures (logic) in the certain routine.

While having a single entry point, one or more of the routines may include multiple ending points in which the routine may return to the calling routine by branching to the return address pushed to the stack by the return address push to stack instruction at the entry point of the routine. The constructor 210 may therefore analyze the assembly code of the routine(s) to identify the return address pop from stack instruction in all ending points of the routine.

The constructor 210 may first analyze the identified return address push to stack instruction to identify the place in the stack that the return address will occupy. The constructor 210 may then iterate through the routines assembly instructions to identify the instructions configured to use the return address from the stack. The constructor 210 may accomplish this by maintaining a value of the current stack pointer and its distance from the return address position and updating the current stack pointer value with each instruction affecting the stack pointer. The constructor 210 may thus detect each instruction using the pushed return address and may identify this instruction as a return address pop from stack instruction.

One or more of the routines may include internal branches in which the processor may be directed to branch to another location within the same routine. The constructor 210 may therefore be adapted to further analyze branch target locations of the internal branches to check for possible return address pop from stack instructions.

Naturally, the constructor 210 maintains a record of analyzed routines and/or part thereof to avoid re-analyzing an already analyzed code section.

The constructor 210 may mark the identified locations of the return address push to stack instructions and the return address pop from stack instructions identified in the relevant routine(s) of the intermediate code file(s), i.e. the routine(s) in which such instructions are present.

A shown at 108, the constructor 210 may adjust the intermediate code file(s) by adjusting one or more of the routines in which return address push/pop to/from stack instructions were identified and marked to include the RAP measures (logic). Specifically, the constructor 210 adjusts each such routine by replacing the identified return address push to stack instruction with a prologue code segment and replacing each identified return address pop from stack instruction with a corresponding epilogue code segment.

The constructor 210 may add the prologue code segment and/or the epilogue code segment(s) to replace the return address push to stack instruction and/or the return address pop from stack instruction(s) respectively using one or more coding methods, techniques and/or implementations. For example, the constructor 210 may replace each of the return address push to stack instruction and/or the return address pop from stack instruction(s) with a trampoline branch function configured to invoke the respective added code segment during the push and pop address operations. Prior to inserting the added code segments to the adjusted intermediate code file(s), the constructor 210 may verify there are sufficient available resources, for example, storage space and/or the like for hosting the added code segment(s). However, since the added code segments typically comprise very simple logic, the footprint of the added code segments may be significantly small thus presenting no limitations in integrating them into the adjusted intermediate code file(s).

The prologue code segment replacing the return address push to stack instruction is configured to alter the stack after the return address is pushed into stack thus creating a unique signature which may be later validated by the respective prologue code segment(s) replacing the return address pop from stack instruction(s). During runtime, when one or more processors execute the executable file(s) generated using the adjusted intermediate code file(s), the epilogue code segment may access the stack to retrieve the return address pushed into the stack by the respective prologue code segment and attempt to validate the stack alteration made by the respective prologue code segment. In case the epilogue code segment is able to validate the stack alteration, the epilogue code segment may allow the processor(s) to branch to the retrieved return address. However, in case the epilogue code segment cannot validate the stack alteration, the epilogue code segment may cause the processor(s) to initiate one or more predefined actions. The predefined actions may include for example, crashing execution of the processor(s), halting execution of the processor(s), causing the processor(s) to branch to a predefined address, preventing the processor(s) from executing at least one potentially malicious code instruction targeted by a corrupted stack, generating one or more indications and/or alerts of invalid stack alteration and/or the like. The predefined actions may be selected according to one or more parameters of the execution flow, for example, the processor architecture, a severity and/or criticality of each routine, a user defined parameter and/or the like.

The constructor 210 may apply one or more methods, techniques and/or implementations for configuring the prologue code segment and the epilogue code segment to apply the stack alteration and recover the stack alteration respectively using one or more methods, techniques and/or implementations.

In a first exemplary implementation, the prologue code segment may be configured to alter the stack by modifying the return address pushed into the stack in a reversible manner such that the respective epilogue code segment(s) may recover the originally pushed return address from the modified return address. The prologue code segment may be configured to read the return address pushed into the stack, alter the return address in a reversible manner, for example, encrypt the return address and push the altered return address back into the stack. The prologue code segment may alter the return address by applying one or more mathematical operators, logic operators and/or the like to the originally pushed return address. For example, the prologue code segment may be configured to alter the return address by applying a XOR operation to the return address with a randomly selected constant value. The randomly selected constant value may be generated, for example, using random number generator. In another example, the randomly selected constant value may be randomly selected from a dataset comprising an extremely large number of random values.

The respective epilogue code segment(s) may be configured to recover and/or decrypt the originally pushed return address from the altered return address by reversing the operation made by the respective prologue code segment. For example, assuming the prologue code segment is configured to XOR the return address with the randomly selected constant value, the epilogue code segment(s) may be configured to XOR the altered return address with the same constant value (used by the prologue code segment) to recover the originally pushed return address. The respective epilogue code segment(s) may be further configured to validate the recovered return address before branching to the return address retrieved (popped) from the stack. For example, one or more of the respective epilogue code segment(s) may verify the recovered return address is within a valid address range of the program code coded in the intermediate code file(s).

During runtime, the randomly selected constant value serving as the unique signature for the altered stack may be validated by the epilogue code segment(s) before branching to the return address retrieved from the stack. In order to make the added prologue and epilogue code segments agnostic to the architecture, instruction set and/or operating system of the processor(s) executing the executable file(s) created using the adjusted intermediate code file(s), the randomly selected constant value used for the XOR operation may be defined as a global constant to ensure thread safety. However, in order to increase security, the randomly selected constant value may be transient and frequently replaced, for example, randomly selected during every startup sequence (boot) of the processor running the executable file(s), during the first invocation of the prologue code segment and/or the like.

In a second exemplary implementation, the prologue code segment may be configured to alter the stack using stack canaries, i.e. pushing a marker (canary) into the stack in a location adjacent to the location of the pushed return address such that the respective epilogue code segment(s) may validate the value of the marker pushed into the stack. The adjacent location in the stack where the marker is pushed may precede the location of the pushed return address in the stack or succeed the location of the pushed return address. For example, in case the stack employs a full descending stack implementation in which the stack address decrements with every push instruction, the marker may be pushed in an address location preceding the address of the pushed return address. In another example, in case the stack employs a full ascending stack implementation in which the stack address increments with every push instruction, the marker may be pushed in an address location succeeding the address of the pushed return address. Specifically, the prologue code segment may be configured to insert a constant value marker into the adjacent location in the stack while the respective epilogue code segment(s) may be configured to verify the value of the marker pushed into the stack by the prologue code segment. The constant value marker may be generated, for example, using random number generator such as, for example, a hardware True Random Number Generator (TRNG), a software Pseudorandom Generator (PRNG) and/or the like. In another example, the constant value marker may be randomly selected from a dataset comprising an extremely large number of random values.

As described for the randomly selected constant value used for the XOR operation in the previous exemplary stack alteration implementation, in order to make the added prologue and epilogue code segments agnostic to the architecture, instruction set and/or operating system of the processor(s), the constant value marker inserted by the prologue code segment and verified by the epilogue code segment(s) may be defined as a global constant to ensure thread safety. Similarly, in order to increase security, the constant value marker may be transient and frequently replaced, for example, randomly selected during every startup sequence (boot) of the processor running the executable file(s), during the first invocation of the prologue code segment and/or the like.

During runtime, the pushed constant value marker serving as the unique signature for the altered stack may be validated by the epilogue code segment(s) before branching to the return address retrieved from the stack. Since the marker is pushed into the stack, the stack layout set during the compilation phase may change as the distance of some parameters of the adjusted routine from the stack pointer may therefore change. The constructor 210 may therefore analyze the disassembled code of the adjusted routine to search for instructions that access these parameters in the stack and amend these instructions to access the correct offset in the stack. For example, assuming the intermediate code file(s) are compiled for the ARM architecture and instruction set, the constructor 210 may search for 'ldr Rn, [sp # offset]' instructions where 'sp' is the stack pointer. The constructor 210 may then amend the '# offset' value according to the new layout of the stack, i.e. according to the new distance of the each of the parameters from the stack pointer.

One or more of the return address push to stack instructions identified and marked in one or more of the routines in the intermediate code file(s) may be associated with pushing one or more data items to the stack. The constructor 210 may therefore configure the prologue code segment(s) added to replace such return address push to stack instructions accordingly to push the data item(s) into the stack. For example, assuming the trampoline branch function is applied to insert a certain prologue code segment in a certain routine comprising one or more data push to stack instructions. The constructor 210 may configure the certain prologue code segment to separate the return address push to stack instruction from the data push to stack instruction(s) such that the data push to stack instruction(s) are conducted after completion of execution of the certain prologue code segment. Complementary, the return address pop from stack instruction(s) corresponding to such return address push to stack instructions may retrieve the pushed data items while retrieving the return address from the stack. The constructor 210 may therefore configure the respective epilogue code segment(s) added to replace such return address pop from stack instruction(s) accordingly to retrieve the data item(s) pushed into the stack by the corresponding prologue code segment(s). Continuing the presented example, assuming the trampoline branch function is applied to insert a certain epilogue code segment corresponding to the certain prologue code segment inserted in the certain routine comprising one or more data push to stack instructions. The constructor 210 may configure the certain epilogue code segment to separate the return address pop from stack instruction(s) from the data pop from stack instruction(s) such that the data pop from stack instruction(s) are conducted prior to execution of the certain epilogue code segment.

A shown at 110, the constructor 210 amends data, instruction(s), symbol table(s) and/or one or more attributes of the intermediate code file(s) affected by the adjustment of the intermediate code file(s) done to include the prologue code segment(s), the epilogue code segment(s) and/or the markers.

For example, the layout of one or more of the adjusted routines in the intermediate code file(s) as defined during the compilation of the intermediate code file(s) may change due to the insertion of the added code segments and/or markers thus changing the relative locations of one or more instructions and/or data items in the adjusted routine(s). The constructor 210 may therefore analyze the disassembled code of the routine(s) to search for instructions and/or data items comprising reference(s) and/or pointer(s) to other instruction(s) and/or other data item(s). The constructor 210 may adjust the detected reference(s) and/or pointer(s) and update them according to the new layout of the routine(s) after insertion of the added code segments and/or markers. For example, assuming the intermediate code file(s) are compiled for the ARM architecture and instruction set, the constructor 210 may search for 'LDR Rn, [pc # offset]' which may be affected by the change of the routine's layout. The adjuster may then amend (update) the '# offset' according to the new layout of the adjusted routine to point to the correct location with respect to the 'pc' which is the program counter.

In another example, the constructor 210 may amend the symbol table of the adjusted routine(s) to reflect the changes applied to the adjusted routine(s) by the insertion of the added code segments and/or markers. For example, the constructor 210 may update the symbol table to include the symbols of the added code segments. The constructor 210 may further amend the symbol table to reflect the address locations of the adjusted routine(s) which may have changed due to the insertion of the added code segments and/or markers.

Moreover, the insertion of the added code segments as well as the insertion of the markers may inflate the size of the respective intermediate code file. The constructor 210 may therefore adjust the adjusted intermediate file(s) to amend one or more attributes of the adjusted intermediate code file(s), for example, the file size and/or the like. For example, assuming the intermediate code file(s) are in ELF format, the constructor 210 may adjust the header of the ELF file(s) to reflect the new offsets and alignments in the routine(s) of the intermediate code file(s) after the insertion of the added code segments and/or markers.

The constructor 210 may include the added code and/or the marker(s) in the adjusted intermediate files(s) themselves. Additionally and/or alternatively, the constructor 210 may include the added code and/or the marker(s) in one or more additional intermediate code files. The additional intermediate code file(s) may be provided together with the adjusted intermediate code file(s) for the generation, build and/or linkage of the executable file(s).

The constructor 210 may also verify that branches to the added code segments implemented, for example, using the trampoline branch functions are valid for build and/or linkage after the intermediate code file(s) are adjusted to reflect the changes implied by the insertion of the added code segments and/or the markers. For example, the constructor 210 may add a relocation entry for each branch to one of the added code segments where the relocation entry comprises a predefined name. The relocation entry may be added to the relocation section describing the relocations for code section(s) containing the branch function(s). If no such code section exists, the relocation entry may be created and added to the existing sections in the intermediate file. The added code segments may be compiled with the same predefined names in one or more of the additional intermediate code files created to include the added code segments.

A shown at 112, the constructor 210 may output the adjusted intermediate code file(s) which may be used for generating, building and/or linking one or more executable files which may be executed by one or more processors. For example, the constructor 210 may transmit the intermediate code file(s) to one or more of the remote networked resources which may use one or more applications, tools and/or the like, for example, a linker, a code builder and/or the like for creating the executable file(s) from the adjusted intermediate code file(s) to create the executable file(s). In another example, the constructor 210 may store the intermediate code file(s) in the storage 206 from where the intermediate code file(s) may be retrieved by one or more applications, tools and/or the like, for example, a linker, a code builder and/or the like for creating the executable file(s). In another example, the constructor 210 may store the intermediate code file(s) in one or more of the attachable storage devices which may be attached to another system where the intermediate code file(s) may be retrieved by one or more applications, tools and/or the like, for example, a linker, a code builder and/or the like for creating the executable file(s).

According to some embodiments of the present invention there are provided methods, systems and computer program products for adjusting one or more of the intermediate code files to prevent ROP exploitation. As described herein before, in runtime a malicious party may exploit ROP divert the processor(s) to invoke one or more gadgets embedded within routine(s) in the intermediate file(s) in attempt to gain control over the processor(s). In order to apply prevent exploitation of the ROP, the intermediate code file(s) may be adjusted to include ROP exploitation preventive logic adapted to identify invalid branch operations which may potentially invoke the gadget(s). Since in runtime the malicious party may manipulate only volatile memory resources, the ROP exploitation prevention logic may be typically applied to indirect branch operations which may retrieve their branch address from volatile memory resources (e.g. stack, heap, register, etc.). Direct branch operations in which the branch address is hardcoded may be immune to ROP exploitation since the branch address is not retrieved from a volatile memory resource. The ROP exploitation prevention logic may therefore not be required and hence not applied for direct branch operations.

Figure 3:
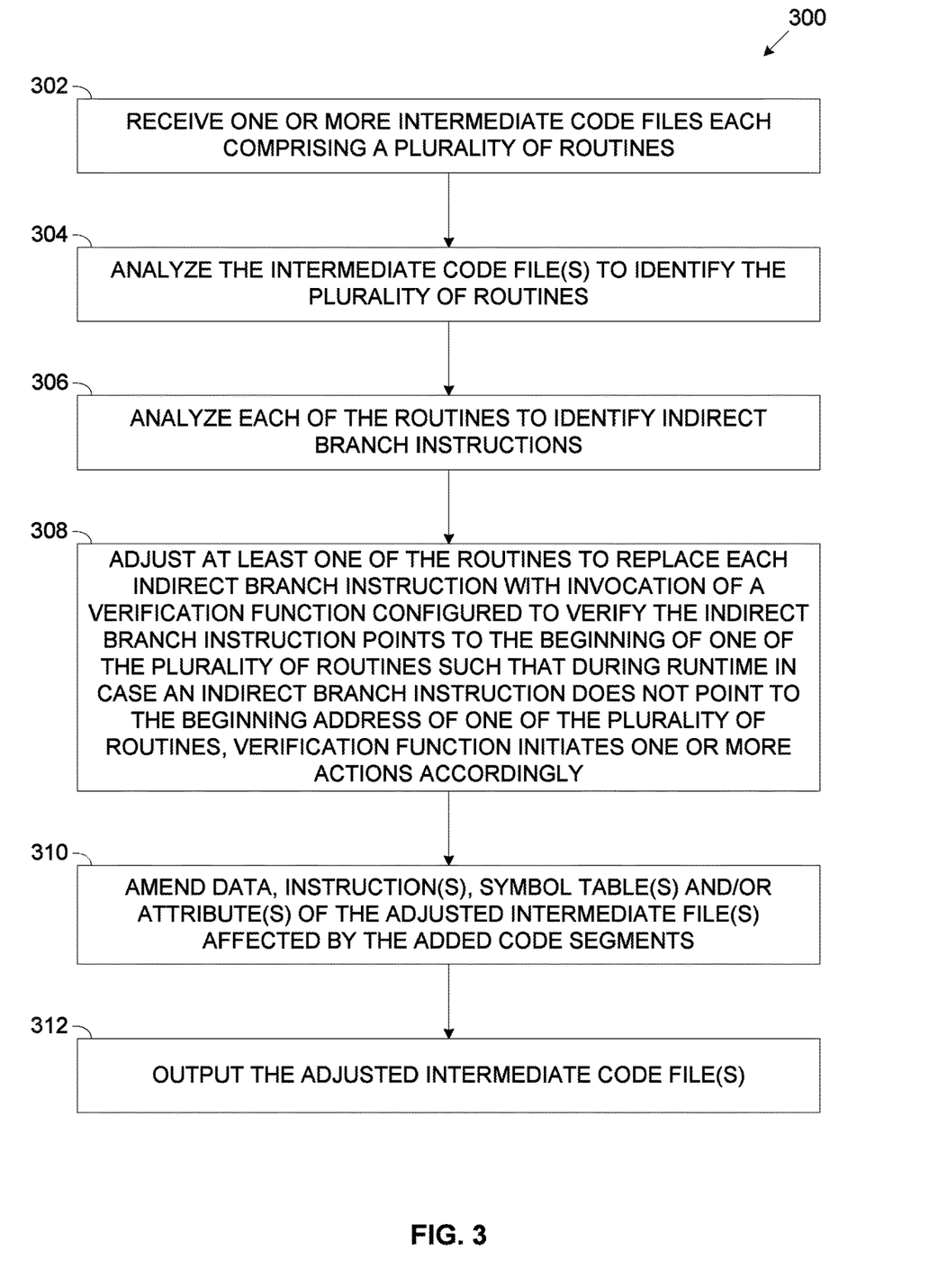
FIG. 3 is a flowchart of an exemplary process of adjusting intermediate code files to apply protection against return oriented programming exploitation, according to some embodiments of the present invention.

Reference is now made to FIG. 3, which is a flowchart of an exemplary process of adjusting intermediate code files to apply protection against return oriented programming exploitation, according to some embodiments of the present invention. An exemplary process 300 may be executed by an adjuster such as the constructor 210 executed by a construction system such as the construction system 200 for adjusting one or more of the intermediate code files to include code configured to prevent ROP.

As shown at 302, the process 300 starts with the constructor 210 obtaining one or more intermediate code files as described in step 102 of the process 100.

As shown at 304, the constructor 210 analyzes each of the intermediate code file(s) to identify all the routines of the intermediate code file as described in step 104 of the process 100.

A shown at 306, the constructor 210 analyzes one or more of the plurality of routines in each of the intermediate code file(s) to identify indirect branches in the routine(s) as described in step 106 of the process 100.

A shown at 308, the constructor 210 may adjust the intermediate code file(s) by adjusting one or more of the routines in which indirect branches were identified and marked to include the ROP exploitation prevention measures (logic). Specifically, the constructor 210 adjusts each such routine by replacing the identified indirect branch with an invocation of a respective verification code segment. The constructor 210 may apply one or more coding methods, techniques and/or implementations for replacing the indirect branch with the invocation of the verification code segment. For example, the constructor 210 may replace one or more indirect branch instructions with respective direct branches pointing to the address location of the added verification code segment(s) such that during runtime, instead of executing the indirect branch, the verification code segment is invoked and executed. The verification code segment(s) may be implemented, for example, using a trampoline function. As described in step 108, prior to inserting the added verification code segment(s) to the adjusted intermediate code file(s), the constructor 210 may verify there are sufficient available resources, for example, storage space and/or the like for hosting the added code segments. However, since the added code segments typically comprise very simple logic, the footprint of the added code segments may be significantly small thus presenting no limitations in integrating them into the adjusted intermediate code file(s).

The constructor 210 may configure each verification code segment to obtain the routine symbol and/or address pointed to by the respective indirect branch instruction. The constructor 210 may further configure the verification code segment to verify that the routine symbol and/or address pointed to by the respective indirect branch is pointing to an address location which is the beginning of a valid routine, i.e. one of the plurality of routines of the intermediate code file(s).

One or more implementations and/or techniques may be applied or transferring to the verification code segment the branch address, i.e. the symbol and/or address of the routine pointed to by one or more of the indirect branch instructions. For example, the branch address may be pushed into the stack such that when invoked, the verification code segment may retrieve (read, pop, etc.) the branch address from the stack. To this end, the constructor 210 may add a push to stack instruction for pushing the branch address included in a respective indirect branch instruction and place the added push to stack instruction before the direct branch instruction inserted to replace the respective indirect branch instruction. In another example, the branch address may be written to a pre-determined register of the processor(s) executing the code such that when invoked, the verification code segment may access the pre-determined register to retrieve the branch address. To this end, the constructor 210 may add a write instruction for writing the branch address included in a respective indirect branch instruction in the pre-determined register and place the added write instruction before the direct branch instruction inserted to replace the respective indirect branch instruction. In another example, the branch address may be written to a predefined variable (and/or structure) stored in memory of the processor executing the code such that when invoked, the verification code segment may access the predefined variable to retrieve the branch address. To this end, the constructor 210 may initialize the pre-defined variable and add a write instruction for writing the branch address included in a respective indirect branch instruction to the predefined variable and place the added write instruction before the direct branch instruction inserted to replace the respective indirect branch instruction.

During runtime, when one or more processors execute the executable file(s) generated using the adjusted intermediate code file(s), the verification code segment may first obtain the routine symbol and/or address (branch address) pointed to by the respective indirect branch and verify that it points to the beginning (address) of a valid routine. In case the verification code segment is able to validate that the branch is conducted to the beginning of a valid routine, the verification code segment may allow the processor(s) to branch to the branch address. However, in case the verification code segment cannot validate that the branch is conducted to the beginning of a valid routine, the verification code segment may determine the indirect branch is invalid and may cause the processor(s) to initiate one or more of the predefined actions. The predefined actions may include, for example, crashing execution of the processor(s), halt execution of the processor(s), causing the processor(s) to branch to a pre-defined address, causing the processor(s) to prevent execution of the gadget(s), causing the processor(s) to generate one or more indications of the invalid branch(s) and/or the like. The predefined actions may be selected according to one or more parameters of the execution flow, for example, the processor architecture, a severity and/or criticality of each routine, a user defined parameter and/or the like.

The constructor 210 may apply one or more methods, techniques and/or implementations for configuring the verification code segment to verify that the routine symbol and/or address pointed to by the respective indirect branch is the beginning of a valid routine.

In a first exemplary implementation, the constructor 210 may associate each of the plurality of routines of each of the intermediate code file(s) with a unique code inserted (added) in an address location preceding the address location of the beginning of the respective routine. Specifically, the constructor 210 associates the unique code with each routine to which an indirect branch is identified during the assembly code analysis of step 306. Optionally, the constructor 210 may associate the plurality of routines with a common, i.e. similar, unique code. For example, the constructor 210 may insert a unique code at the address immediately preceding the beginning address of one or more valid routine. The constructor 210 may select the exact address for insertion of the unique code according to the architecture and/or instruction set of the selected processor. For example, assuming the processor architecture is 32-bit implementing a 32-bit instruction set with a native 'word' granularity of 4 bytes, the constructor 210 may insert the unique code at the address 'beginning address—4'. Moreover, the unique code used by the constructor 210 may not be part of the instruction set of the selected processor(s) to prevent the processor(s) from interpreting it as a valid instruction and thus preventing altering the execution flow of the processor(s). Moreover, the unique code is selected not to be part of the instruction set of the selected processor(s) in order to prevent irrelevant appearance(s) of the unique code which are not inserted by the constructor 210 but rather by the compiler which generated the intermediate code file(s).

The constructor 210 may configure the verification code segment to first retrieve the unique code from the designated address, for example, the address preceding the branch address indicated by the indirect branch instruction. To continue the previous example, in case the unique code is inserted at the address 'beginning address—4', the constructor 210 may configure the verification code segment to first access the 'beginning address—4' to retrieve the unique code. The constructor 210 may further configure the verification code segment to validate the value of the unique code and determine accordingly whether the branch address points to the beginning address of one of the valid routines.

During runtime, in case the verification code segment positively validates the value of the unique code, the verification code segment may determine that the indirect branch is pointing to the beginning of a valid routine. However, in case the verification code segment fails to correctly validate the value of the unique code, the verification code segment may determine that the indirect branch is invalid as it is not pointing to the beginning of a valid routine.

In a second exemplary implementation, the constructor 210 may construct a dataset, for example, a table, a list and/or the like for mapping the beginning address of each of the plurality of routines, specifically, the beginning address of each routine to which an indirect branch is identified during the assembly code analysis of step 306. As such the dataset may include one or more entries each associated with one of the mapped routines and storing the beginning address of the respective routine. The absolute addresses of the routines, in particular the beginning addresses of the routines may not be available for the intermediate code files since it may typically be set during the generation stage of executable file(s), i.e. after build and/or linkage. To overcome this limitation, the constructor 210 may construct the dataset to include a relocation entry for each routine that is mapped in the dataset. During the generation, build and/or linkage of the executable file(s), the relocation entries are replaced with the actual (absolute) beginning address of the mapped routines.

Optionally, the constructor 210 optimizes the arrangement of the routines entries dataset by sorting the entries in one or more orderly sorting schemes, for example, according to the absolute beginning address of the mapped routines. The sorted entries may significantly increase efficiency of traversing the sorted dataset and hence reduce processing time of searching for a match with one of the addresses mapped in the dataset entries. Since the absolute beginning addresses of the routines may not be available before the generation stage of executable file(s), the constructor 210 may include in each of the dataset entries a unique code value which is not part of the instruction set of the target processor(s). After generation, build and/or linkage of the executable file(s), the constructor 210 may search for the unique code(s) in the executable file, for example, an ELF executable file to determine the absolute beginning address of the mapped routines. The constructor 210 may then update the dataset and sort its entries according to the actual beginning addresses of the mapped routines, for example, in an ascending order, in a descending order and/or the like.

The constructor 210 may further adjust the adjusted intermediate code file(s) to include the dataset mapping the beginning address of the routines. Additionally and/or alternatively, the constructor 210 generates one or more additional intermediate code files for storing the dataset mapping the beginning address of the routines. The additional intermediate code file(s) may be used during the generation, build and/or linkage of the executable file(s) to correctly include the dataset in the final build. The exact implementation of the dataset and its storage for runtime use may be selected according to one or more parameters of the computing system targeted by the executable file(s) generated using the adjusted intermediate code file(s).

The constructor 210 may configure the verification code segment to first compare the branch address indicated by the indirect branch instruction to the addresses listed in the dataset to search for match and determine accordingly whether the branch address is the beginning addresses of one of the mapped routines.

During runtime, the verification code segment compares the branch address to the addresses listed in the dataset entries. In case the branch address matches one of the addresses listed in the dataset, the verification code segment may determine that the indirect branch is pointing to the beginning of a valid routine. However, in case the branch address does not match any of the addresses listed in the dataset, the verification code segment may determine that the indirect branch is invalid as it is not pointing to the beginning of a valid routine. As described herein before the dataset may be optimized with its entries sorted. The verification code segment may therefore apply one or more search schemes for traversing the sorted dataset in runtime in search for a match. This may significantly improve access performance of the verification code segment and thus significantly reduce the processing time required for the verification code segment to search for the match.

A shown at 310, the constructor 210 amends data, instruction(s), symbol table(s) and/or one or more attributes of the intermediate code file(s) affected by the adjustment of the intermediate code file(s) done to include the verification code segment(s) as described in step 110 of the process 100.

A shown at 312, the constructor 210 may output the adjusted intermediate code file(s) which may be used for generating, building and/or linking one or more executable files which may be executed by one or more processors as described in step 112 of the process 100.

It is expected that during the life of a patent maturing from this application many relevant systems, methods and computer programs will be developed and the scope of the terms intermediate code files format, intermediate code files analysis tools are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of generating compiled intermediate code files adjusted to prevent return oriented programming exploitation, comprising:
   receiving at least one intermediate code file generated by a compiler, the at least one intermediate code file comprising a plurality of routines;
   adjusting the at least one intermediate code file prior to generation of a respective executable file to be executed by at least one processor, the adjusting comprising:
      analyzing a symbol table of the at least one intermediate code file to identify a beginning address of each of the plurality of routines,
      analyzing each of the plurality of routines to identify at least one indirect branch instruction in at least one of the plurality of routines,
      replacing each indirect branch instruction detected in at least one of the plurality of routines with a direct branch instruction to invoke a respective verification code segment configured to verify, prior to executing the respective indirect branch operation, that the respective replaced indirect branch instruction pointed to the beginning address of one of the plurality of routines, and
      updating the symbol table to reflect addition of the respective verification code segment to the at least one intermediate code file; and
   outputting the at least one adjusted intermediate code file;
   wherein, in runtime, in case the replaced indirect branch instruction did not point to the beginning address of one of the plurality of routines, the respective verification code segment causes the at least one processor to initiate at least one predefined action;
   wherein adjusting the at least one routine further comprising inserting a write instruction before the direct branch instruction for writing an address pointed by the indirect branch instruction to a predefined variable, the written address after retrieved from the predefined variable is used by the verification code segment for the verification;
   wherein verification of the indirect branch instruction pointing to the beginning address of one of the plurality of routines is based on verification of a unique code preceding each of the plurality of routines in the at least one intermediate code file, the unique code verification is applied by:
      adding a unique code to the at least one intermediate code file in an address preceding the beginning address of each of the plurality of routines, and
   configuring the respective verification code segment to verify that the address pointed by the indirect branch function is preceded by the unique code.

2. The method of claim 1, wherein the at least one intermediate code file is a member of a group consisting of: an object file, an archive file and a binary file.

3. The method of claim 1, wherein each of the plurality of routines is a member of a group consisting of: a routine, a sub-routine and a function.

4. The method of claim 1, wherein the direct branch instruction points to the respective verification code segment.

5. The method of claim 1, wherein adjusting the at least one routine further comprising inserting a push to stack instruction before the direct branch instruction for pushing into stack an address pointed by the indirect branch instruction, the pushed address after popped from the stack is used by the verification code segment for the verification.

6. The method of claim 1, wherein adjusting the at least one routine further comprising inserting a write instruction before the direct branch instruction for writing an address pointed by the indirect branch instruction to a pre-determined register, the written address after retrieved from the pre-determined register is used by the verification code segment for the verification.

7. The method of claim 1, wherein verification of the indirect branch instruction pointing to the beginning address of one of the plurality of routines is based on a dataset mapping the beginning address of each of the plurality of routines, the dataset mapping verification is applied by:
   constructing the dataset to map the beginning address of each of the plurality of routines, and
   configuring the respective verification code segment to verify that the address pointed by the indirect branch function matches the beginning address of one of the plurality of routines mapped in the dataset.

8. The method of claim 1, wherein the at least one predefined action is a member of a group consisting of: crashing execution of the at least one processor, halting execution of the at least one processor, causing the at least one processor to branch to a predefined address in the at least one intermediate code file, preventing the at least one processor from executing at least one potentially malicious code instruction and generating an indication that at least one indirect branch instruction is not pointing to the beginning address of one of the plurality of routines.

9. The method of claim 1, wherein the at least one intermediate code file is adjusted to amend at least one of: an instruction and a data element affected by the replacement of the at least one indirect branch with the invocation of the respective verification code segment.

10. A system for generating compiled intermediate code files adjusted to prevent return oriented programming exploitation, comprising:
 a program store storing a code; and
 at least one processor coupled to the program store for executing the stored code, the code comprising:
  code instructions to receive at least one intermediate code file generated by a compiler, the at least one intermediate code file comprising a plurality of routines;
  code instructions to adjust the at least one intermediate code file prior to generation of a respective executable file to be executed by at least one processor, the adjusting comprising:
   analyzing a symbol table of the at least one intermediate code file to identify a beginning address of each of the plurality of routines,
   analyzing each of the plurality of routines to identify at least one indirect branch instruction in at least one of the plurality of routines,
   replacing each indirect branch instruction detected in each of the plurality of routines with a direct branch instruction to invoke a respective verification code segment configured to verify, prior to executing the respective indirect branch operation, that the respective replaced indirect branch instruction pointed to the beginning address of one of the plurality of routines, and
   updating the symbol table to reflect addition of the respective verification code segment to the at least one intermediate code file; and
  code instructions to output the at least one adjusted intermediate code file;
 wherein, in runtime, in case the replaced indirect branch instruction did not point to the beginning address of one of the plurality of routines, the respective verification code segment causes the at least one processor to initiate at least one predefined action;
  wherein adjusting the at least one routine further comprising inserting a write instruction before the direct branch instruction for writing an address pointed by the indirect branch instruction to a predefined variable, the written address after retrieved from the predefined variable is used by the verification code segment for the verification;
  wherein verification of the indirect branch instruction pointing to the beginning address of one of the plurality of routines is based on verification of a unique code preceding each of the plurality of routines in the at least one intermediate code file, the unique code verification is applied by:
   adding a unique code to the at least one intermediate code file in an address preceding the beginning address of each of the plurality of routines, and
   configuring the respective verification code segment to verify that the address pointed by the indirect branch function is preceded by the unique code.

11. A computer program product comprising at least one executable file generated from at least one intermediate code file adjusted to prevent return oriented programming exploitation, comprising:
 a non-transitory computer readable storage medium storing thereon:
  a plurality of program instructions of at least one adjusted routine of a plurality of routines of an executable file generated for execution by at least one processor from at least one intermediate code file adjusted to support return address protection, each indirect branch instruction in the at least one adjusted routine is replaced with a direct branch instruction to invoke at least one verification code segment, and
  a plurality of program instructions of the at least one verification code segment configured to:
   verify that the replaced indirect branch instruction pointed to a beginning address of one of the plurality of routines, and
   cause, in run-time, the at least one processor to initiate at least one predefined action in case the replaced indirect branch instruction did not point to the beginning address of one of the plurality of routines;
 wherein if exists, a symbol table of the executable file created based on an updated symbol table of the at least one adjusted intermediate code reflects the addition of the at least one verification code segment to the at least one intermediate code file;
 wherein the plurality of program instructions are executed by the at least one processor from the non-transitory computer readable storage medium;
  wherein adjusting the at least one routine further comprising inserting a write instruction before the direct branch instruction for writing an address pointed by the indirect branch instruction to a predefined variable, the written address after retrieved from the predefined variable is used by the verification code segment for the verification;
  wherein verification of the indirect branch instruction pointing to the beginning address of one of the plurality of routines is based on verification of a unique code preceding each of the plurality of routines in the at least one intermediate code file, the unique code verification is applied by:
   adding a unique code to the at least one intermediate code file in an address preceding the beginning address of each of the plurality of routines, and
   configuring the respective verification code segment to verify that the address pointed by the indirect branch function is preceded by the unique code.

* * * * *

UNITED STATES PATENT AND TRADEMARK OFFICE
CERTIFICATE OF CORRECTION

| | | |
|---|---|---|
| PATENT NO. | : 11,231,948 B2 | Page 1 of 1 |
| APPLICATION NO. | : 16/590404 | |
| DATED | : January 25, 2022 | |
| INVENTOR(S) | : Natali Tshouva et al. | |

It is certified that error appears in the above-identified patent and that said Letters Patent is hereby corrected as shown below:

On the Title Page

Item (72) Inventors, Line 3, "Tai Granot" should be changed to -- Tal Granot --

Signed and Sealed this
Seventeenth Day of May, 2022

Katherine Kelly Vidal
*Director of the United States Patent and Trademark Office*